United States Patent [19]
Shimizu et al.

[11] Patent Number: 5,941,339
[45] Date of Patent: Aug. 24, 1999

[54] CABLE-TYPE STEERING DEVICE

[75] Inventors: Yasuo Shimizu; Hiroshi Tabata, both of Wako, Japan

[73] Assignee: Honda Giken Kogyo Kabushiki Kaisha, Tokyo, Japan

[21] Appl. No.: 08/917,333

[22] Filed: Aug. 25, 1997

[30] Foreign Application Priority Data

Aug. 28, 1996 [JP] Japan ..................................... 8-226474

[51] Int. Cl.⁶ ....................................................... B62D 5/04
[52] U.S. Cl. .......................................... 180/444; 74/500.5
[58] Field of Search ................................... 180/443, 444, 180/445, 446; 74/89.2, 89.22, 502.3, 501.6, 500.5, 502.5

[56] References Cited

U.S. PATENT DOCUMENTS

| | | | |
|---|---|---|---|
| 4,850,606 | 7/1989 | Weisgerber et al. | 180/443 |
| 5,598,897 | 2/1997 | Sugiura | 180/417 |

FOREIGN PATENT DOCUMENTS 8-2431  1/1996  Japan .

Primary Examiner—Kevin Hurley
Attorney, Agent, or Firm—Armstrong, Westerman, Hattori, McLeland & Naughton

[57] ABSTRACT

A cable-type steering device with electric power-steering assist in which the structure of the steering torque transmitting system is simplified and the loss in transmission of the steering torque is decreased. An output shaft of a motor in an electric power-steering device is rotatably carried around an outer periphery of a steering rod and connected to the steering rod through a ball screw mechanism. A follower pulley, to which a steering torque from a steering wheel is transmitted through Bowden wires, is spline-coupled to an outer periphery of the output shaft of the motor. When the output shaft of the motor is rotated by the steering torque of the steering wheel transmitted to the follower pulley or by the output torque from the motor, the steering rod is moved laterally by the ball screw mechanism to turn the steerable wheels of a vehicle.

3 Claims, 7 Drawing Sheets

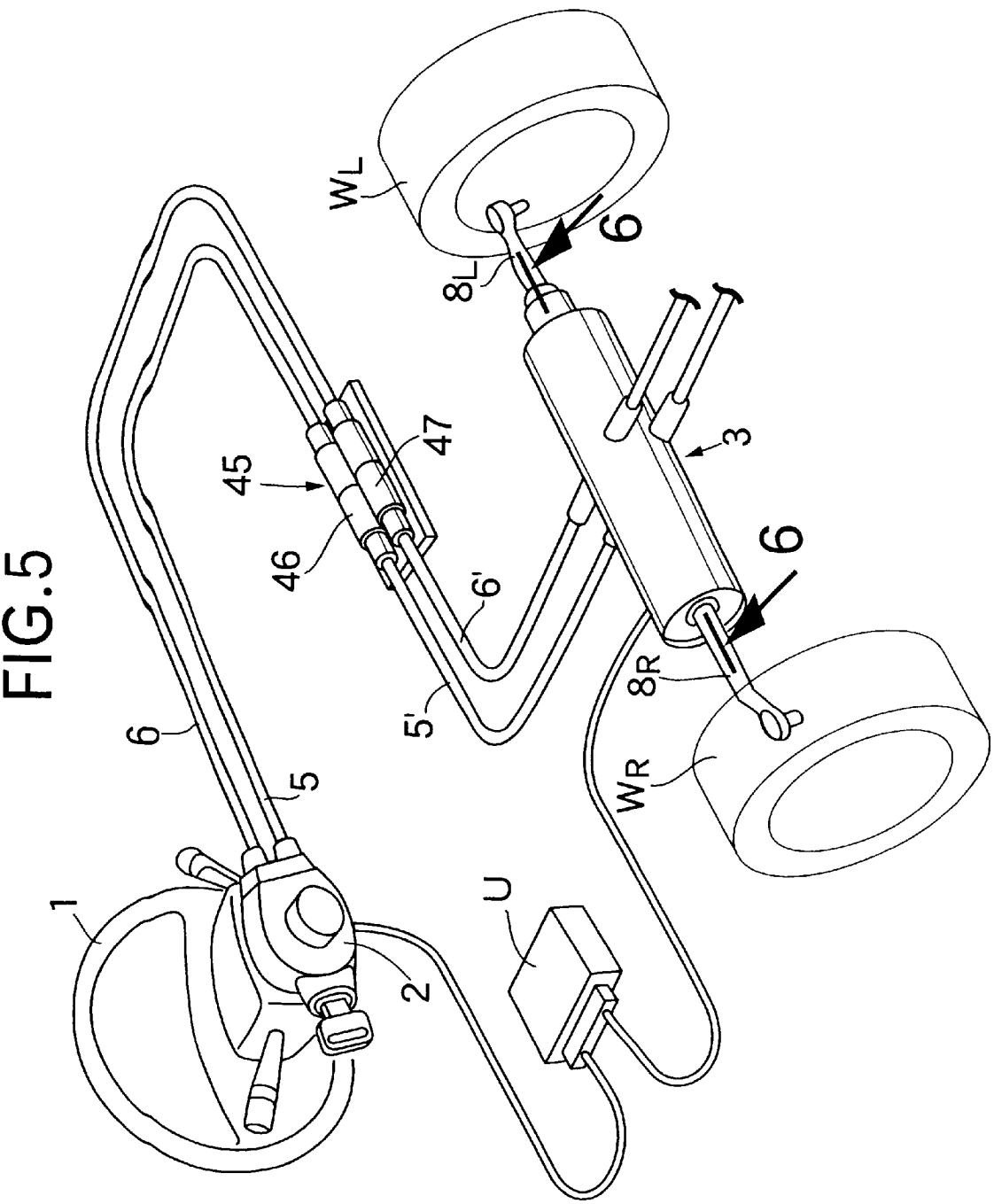

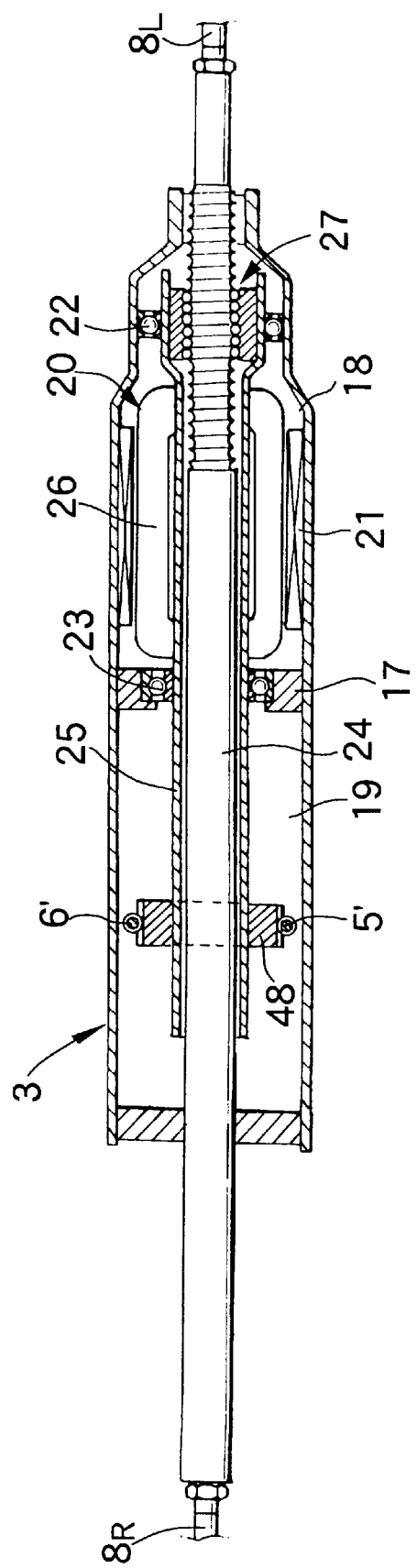

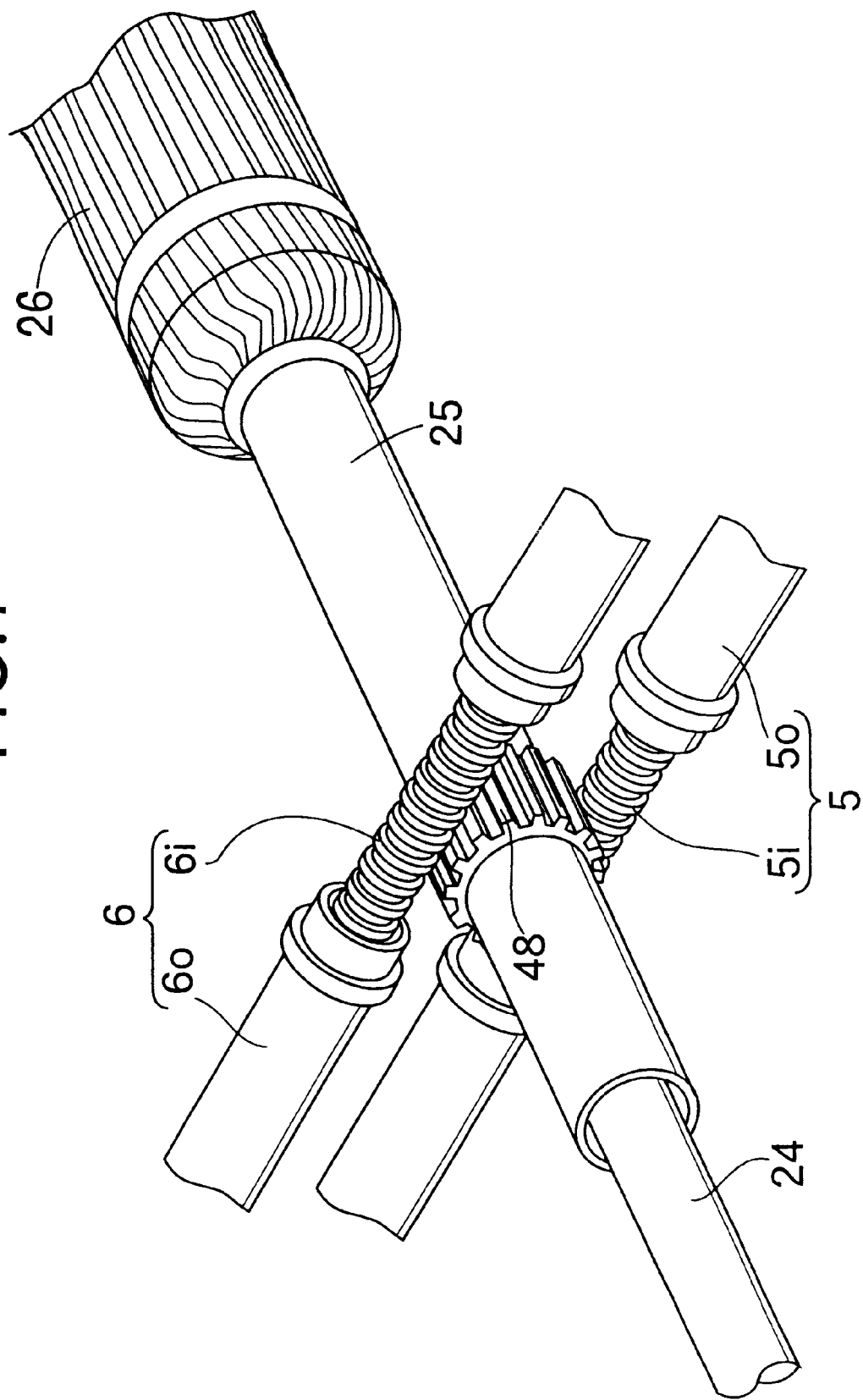

CABLE-TYPE STEERING DEVICE

BACKGROUND OF THE INVENTION

1. Field of the Invention

The present invention relates to a cable-type steering device, including a wire driving means connected to a steering wheel, and a wire follower means connected to a gear box for steering vehicle wheels. The wire driving means and the wire follower means are connected to each other by wires, so that a steering torque inputted to the steering wheel is transmitted to the gear box through the wires.

2. Description of Related Art

In a conventional steering device for a vehicle, a steering shaft having a steering wheel at an upper end thereof is connected at its lower end to a gear box, so that a steering torque inputted to the steering wheel is transmitted through the steering shaft to a rack and pinion mechanism which is mounted within the gear box.

However, if the steering wheel and the gear box are connected to each other using the steering shaft, it is difficult to freely select the position of the steering wheel relative to the position of the gear box. For this reason, there is encountered a problem that the degree of freedom of design is substantially limited, and the gear box can not be commonly used in a right-hand steered vehicle and a left-hand steered vehicle. Moreover, another problem is that vibrations inputted to a tire from a road surface and the vibration of an engine are transmitted to the steering wheel through the steering shaft and hence, the sound level within a vehicle compartment and the riding comfort are impeded by such vibrations.

Therefore, there is, a proposed cable-fype steering device which employs a flexible transmitting means such as Bowden wire, and the like in place of the conventional steering shaft. (see Japanese Patent Application Laid-open No.8-2431).

If the construction of the proposed cable-type steering device is used, the position of the steering wheel retentive to the position of the gear box can be freely selected and moreover, the vibration of the gear box is not readily transmitted to the steering wheel and hence, the above-described problems can be solved.

When such cable-type steering device is combined with an electric power-steering device, the following problem is encountered: there are required a steering torque transmitting system for transmitting a steering torque provident by the cable-type steering device to vehicle wheels, for example, through a rack and pinion mechanism, and a steering torque transmitting system for transmitting a steering torque provided by a motor of the power-steering device to the vehicle wheels, for example, through a ball screw mechanism. These two steering torque transmitting systems require a complicated structure and cause a loss in transmission of the steering torque.

SUMMARY OF THE INVENTION

The present invention has been accomplished with the above circumstance in view, and it is an object of the present invention to simplify the steeling torque transmitting system and decrease the loss in transmission of the steering torque in a combination of the cable-type, steering device with the electric power-steering assist device.

To achieve the above object, according to the present invention, when the steering torque inputted to the steering, wheel is transmitted to the gear box through the wires for steering the vehicle wheels, the steering torque is assisted by the motor mounted in the gear box, the wire follower means in the gear box to which the steering torque of the steering wheel is transmitted through the wires is coaxially coupled to the output shaft of the motor. Therefore, the steering torque from the wire follower means and the steering torque from the motor can be transmitted to the wheels through a common steering torque transmitting system, This leads to a simplified structure of the steering torque transmitting system, and to a reduced loss in transmission of the steering torque.

BRIEF DESCRIPTION OF DRAWINGS

FIG. 5 is a perspective view of the entire arrangement of a steering device for a vehicle according to a second embodiment of the present invention.

FIG. 6 is an enlarged sectional view taken along a line 6—6 in FIG. 5;

FIG. 7 is a perspective view of meshed portions of a pinion and inner cables.

DESCRIPTION OF THE PREFERRED EMBODIMENTS

Figure 1:
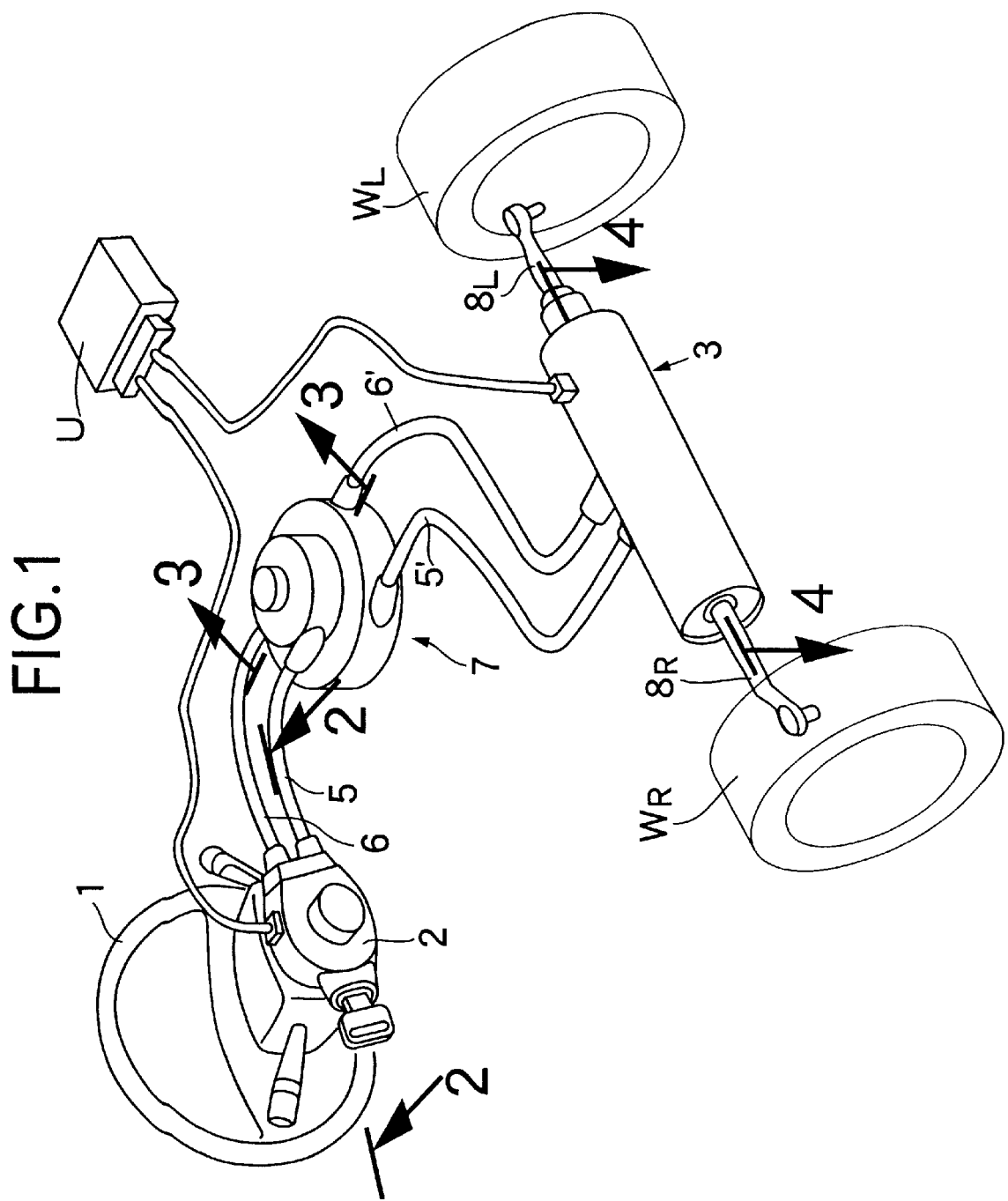
FIG. 1 is a perspective view of the entire arrangement of a steering device for a vehicle according to a first embodiment of the invention.

The mode for carrying out the present invention will now be described by way of embodiments with reference to the accompanying drawings, As shown in FIG. 1, a driving pulley housing 2 mounted in front of a steering wheel 1 of an automobile and a gear box 3 are connected to each other by two first Bowden wires 5 and 6, an intermediate interlocking means 7 and two second Bowden wires 5' and 6'. Tie rods, $8_L$ and $8_R$ extend laterally of a vehicle body from opposite ends of the gear box 3 and are connected to knuckles (not shown) for supporting left and right wheels $W_L$ and $W_R$. An electronic control unit U is mounted between the driving pulley housing 2 and the gear box 3.

Figure 2:
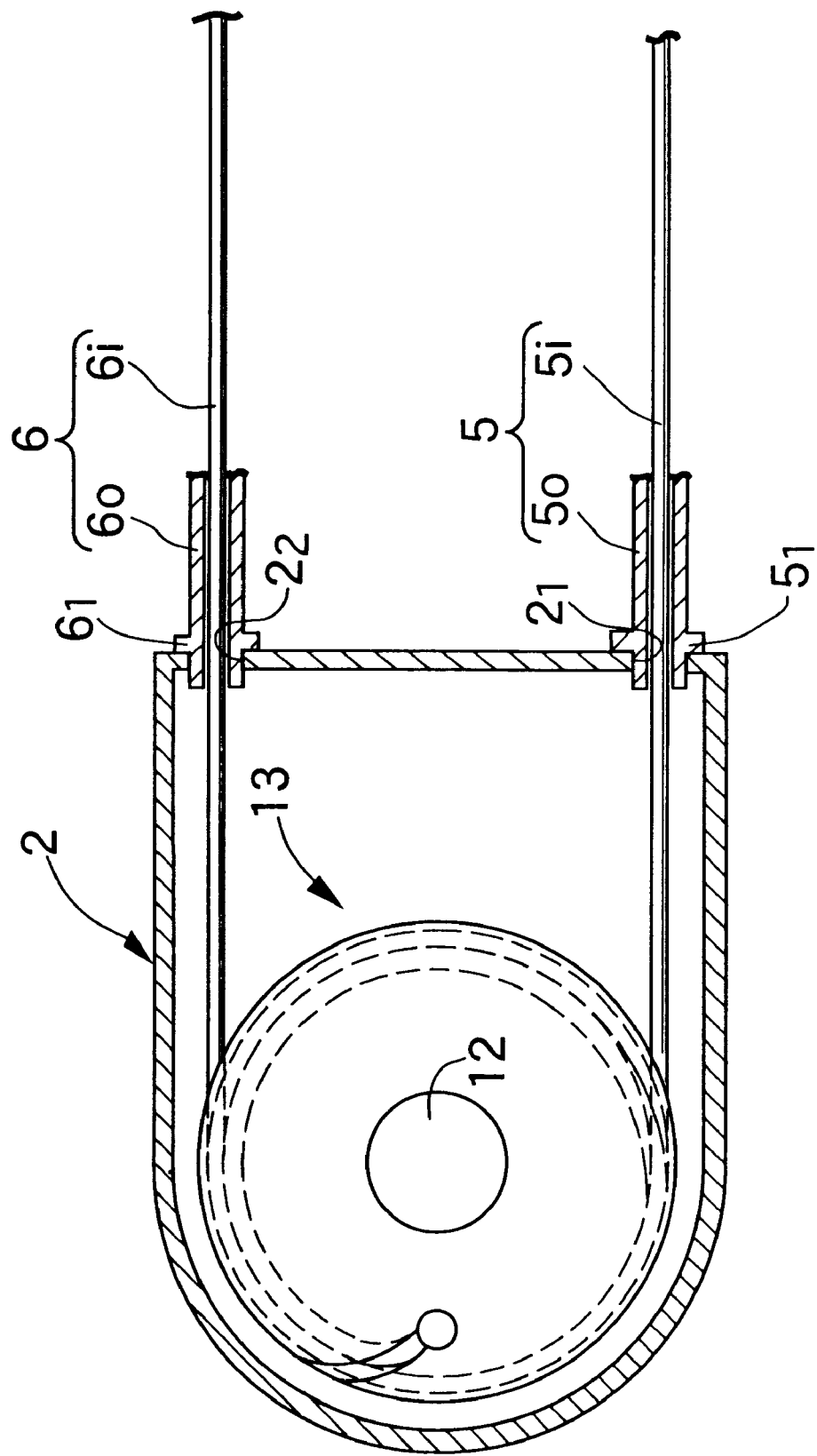
FIG. 2 is an enlarged sectional view taken along a line 2—2 in FIG.1.

As shown in FIG. 2, a driving pulley 13 is fixed to a rotary shaft 12 which is rotatably supported in the driving pulley housing 2 and rotated along with the steering wheel 1. The first Bowden wire 5 is comprised of an outer tube 5o, and an inner cable 5i slidably accommodated within the outer tube 5o. Likewise, the first Bowden wire 6 is comprised of an outer tube 6o, and an inner cable 6i slidably accommodated within the outer tube 6o.

One end of each of the inner cables 5i and 6i is wound around and fixed in a helical pulley groove defined around an outer periphery of the driving pulley 13. One end of each of the outer tubes 5o and 6o passes through the two cable insert bores $2_1$ and $2_2$ defined in the driving pulley housing 2 and is fixed to an inner surface of the driving pulley housing 2 by flange portion $5_1$ and $6_1$.

Figure 3:
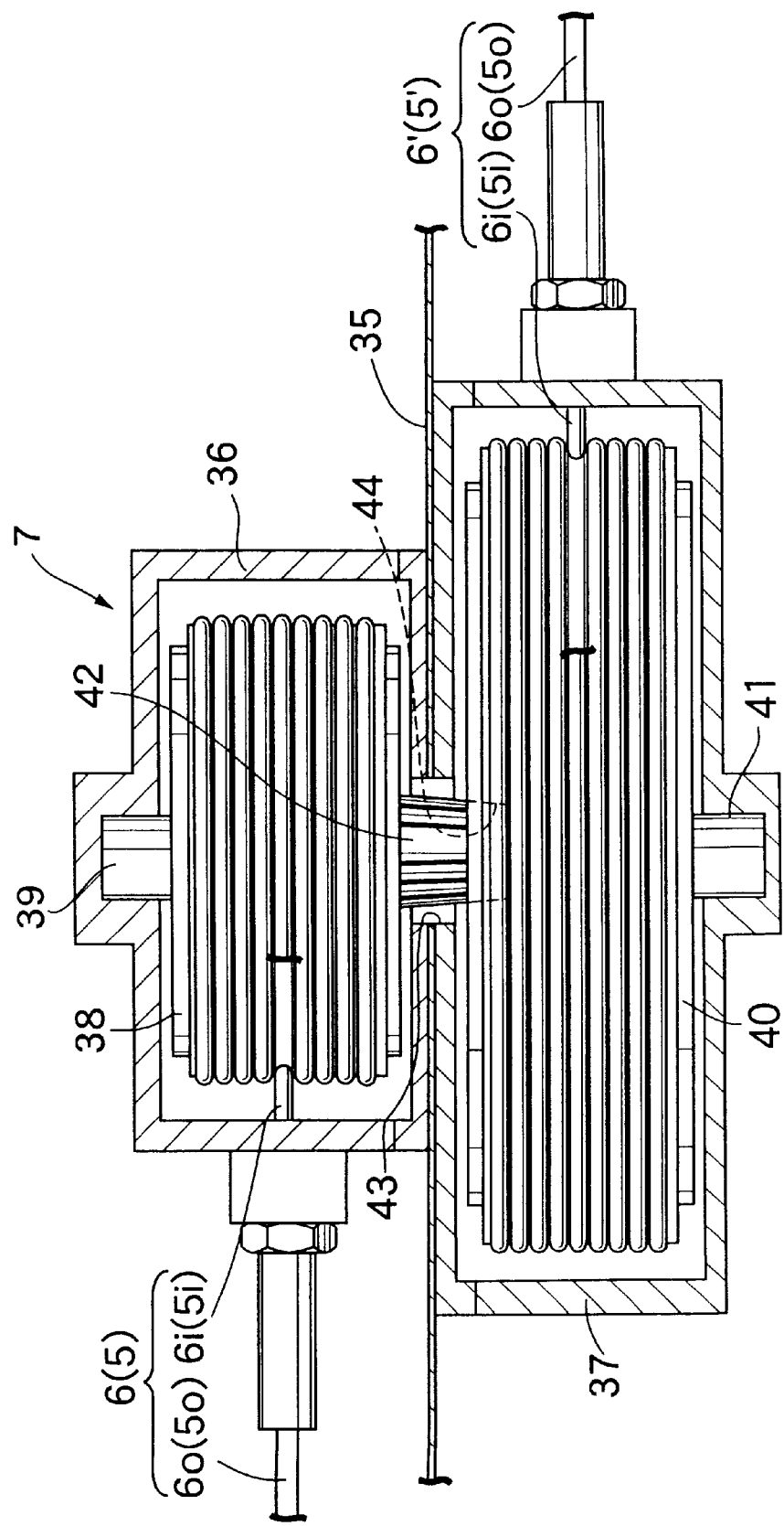
FIG. 3 is an enlarged sectional view taken along a line 3—3 in FIG.1.

As shown in FIG. 3, the intermediate interlocking means 7 includes a first housing 36 and a second housing 37 which are integrally coupled to each with a partition wall 35 of a vehicle body such as a dash board lower member or the like being interposed therebetween. An intermediate follower pulley 38 is supported in the first housing 36, so that it can be rotated by a first rotary shaft 39, and an intermediate driving pulley 40 having a diameter larger than that of the intermediate follower pulley 38 is supported in the second housing 37, so that it can be rotated by a second rotary shaft 41.

The intermediate follower pulley 38 has a tapered spline shaft 42 in a side opposite from the first rotary shaft 39. The spline shaft 42 is passed through through-bores 43 defined in the first housing 36, the partition wall 35 and the second housing 37 to engage a spline bore 44 defined in a side of the intermediate driving pulley 40 opposite from the second rotary shaft 41. Thus, the intermediate follower pulley 38 and the, intermediate driving pulley 40 are coaxially coupled to each other and rotated in unison with each other.

The other ends of the first Bowden wires 5 and 6 are fixed in such a manner that the outer tubes 5o and 6o are fixed to the first housing 36, and the inner cables 5i , 6i are wound around an outer periphery of the intermediate follower pulley 38 within the first housing 36. Likewise, one end of each of the second Bowden wires 5' and 6' is fixed in such a manner that the outer tubes 5o and 6o are fixed to the second housing 37, and the inner cable 5i and 6i are wound around an outer periphery of the intermediate driving pulley 40 within the second housing 37.

Figure 4:
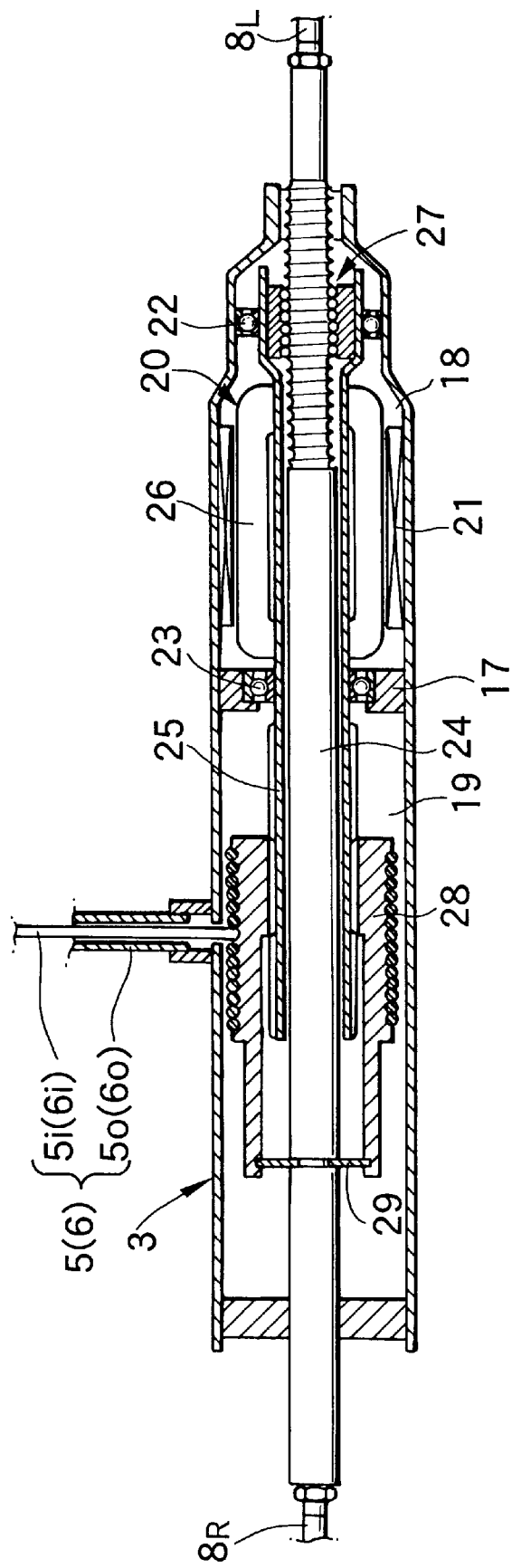
FIG. 4 is an enlarged sectional view taken along a line 4—4 in FIG. 1.

As shown in FIG. 4, the inside of the gear box 3 is divided into a motor accommodating is chamber 18 and a follower pulley accommodating chamber 19 by a partition wall 17. A motor 20 for a power-steering operation is accommodating in the motor accommodating chamber 18 of the gear box 3 and includes a stator 21 fixed to an inner peripheral surface of the motor accommodating chamber 18, a cylindrical motor output shaft 25 fitted over an outer periphery of a steering rod 24, and rotatably supported by two ball bearings 22 and 23, and a rotor 26 secured to the motor output shaft 25 and opposed to the stator 21. A ball screw mechanism 27 is mounted between an inner peripheral surface of the motor output shaft 25 and an outer peripheral surface of the steering rod 24, so that a steerage assisting force for reciprocally moving the steering rod 24 in a lateral direction can be generated by driving the motor 20 to rotate the motor output shaft 25 in opposite directions.

A follower pulley 28 is provided in the follower pulley accommodating chamber 19 of the gear box 3 and spline coupled to the outer periphery of the motor output shaft 25 for axially sliding movement and for non-rotation relative to each other. In order to move the follower pulley 28 laterally long with the steering rod 24 and to permit the relative rotation of the follower pulley 28 relative to the steering rod 24, an annular groove defined in an inner periphery of the follower pulley 28 and an annular groove defined in an outer periphery of the steering rod 24 are connected to each other by it ring member 29 which is capable of being slipped in both the annular grooves.

the other ends of the outer tubes $5_o$ and $6_o$ of the two second Bowden wires 5' and 6' are fixed to a wall surface of the gear box 3, while the corresponding ends of the inner cables 5i and 6i are guided into the gear box 3, wound around and fixed in a single pulley groove helically defined in the outer periphery of the follower pulley 28. The two inner cables 5i and 6i extending into the gear box first contact the follower pulley 28 at two diametrically opposed points near the axial center of the follower pulley 28, and each of the inner cables 5i, 6i is wound therefrom in opposite direrctions toward each axial end of the follower pulley 28 and fixed thereto. therefore, when the follower pulley 28 is rotated, one of the two inner cables 5i and 6i is wound up around the pulley groove, and the other inner cable is unwound from the pulley groove, The operation of the embodiment of the present invention having the above-described arrangement will be described below, When the steering wheel 1 is rotated to turn the vehicle, the rotary shaft 12 is rotated along with the driving pulley 13 In FIG. 2, thereby causing the inner cables 5i and 6i of the first Bowden wires and 6 to be pushed and pulled. As a result, the intermediate follower pulley 38 of the intermediate interlocking means 7 is rotated in FIG. 3, and such rotation is transmitted to the intermediate driving pulley 40 through the spline shaft 42 and the spline bore 44. In this case, the displacement of the first Bowden wires 5 and 6 is enlarged due to a difference in diameter between the intermediate follower pulley 38 and the intermediate driving pulley 10 and transmitted to the second Bowden wires 5' and 6'.

When the follower pulley 28 of the gear box 3 is rotated by the displacement of the second Bowden wires 5'and 6' in FIG. 4. the motor output shaft 25 integral with the follower pulley 28 is rotated, so that steering rod 24 is moved laterally through the ball screw mechanism 27 to steer the wheels $W_L$ and $W_R$. When the steering rod 24 is moved laterally, the follower pulley 28 connected to the steering rod 24 through the ring member 29 is also moved laterally in unison with the steering rod 24. In this case, even it the follower pulley 28 is moved laterally over a predetermined distance relative to the gear box 3, portions of the inner cables 5i and 6i drawn from the follower pulley 28 are also moved in opposite directions over the same distance as such predetermined distance relative to the follower pulley 28, because the pitch of The hall screw mechanism 27 and the pitch of the pulley groove of the follower pulley 28 are set equally to each other. As a result, the portions of the inner cables 5i and 6i drawn from the follower pulley 28 can be always maintained at a given position relative to the gear box 3, and the outer tubes $5_o$ and $6_o$ and the inner cables 5i and 6i can be maintained concentrically.

As soon as the steering torque of the steering wheel 1 is transmitted to the follower pulley 28 in the above manner, the steering torque is detected by a detecting means (not shown) provided in the driving pulley housing 2. The detected steering torque is subjected to a calculation along with other control signals in the electronic control unit U, and the motor 20 for the power-steering operation is driven based on the result of the calculation. Thus, the motor output shaft 25 is rotated to bias the steering rod 24 laterally, thereby assisting the operation of the steering wheel 1 provided by a driver.

Since the steering wheel 1 and the gear box 3 are connected to each other by the flexible first Bowden wires 5 and 6 and second Bowden wires 5' and 6', as described above, the steering wheel 1 can be disposed at any position relative to the gear box 3, leading to a considerably increased degree of freedom of design. Thus, for example, the gear box 3 can be commonly used in a right-hand steered vehicle and in a left-hand steered vehicle, and the structures of a tilt mechanism and telescopic mechanism for the steering wheel 1 can be simplified.

The conventional steering shaft for connecting the steering wheel 1 and the gear box 3 is not used and hence, the vibration of the gear box 3 and the vibration of an engine are not readily transmitted to the steering wheel 1, thereby providing an enhanced riding comfort, and also ensuring a sufficient space around driver's feet to enhance operator comfort. Moreover, in the event of a collision of the vehicle, the steering wheel 1 can be moved at a sufficient stroke forwards of the vehicle body and hence, a large shock absorbing effect can be obtained.

Further, since the follower pulley 28 is mounted within the gear box 3 integrally with the motor output shaft 25, the transmission of the steering torque from the motor 20 to the steering rod 24 and the transmission of the steering torque from the follower pulley 28 to the steering rod 24 can be achieved by the common ball screw mechanism 27, thereby simplifying the structure by a reduction in number of parts, and decreasing the previously experienced loss in transmission of the steering torque. FIGS. 5 to 7 illustrate a second embodiment of the present invention. FIG. 5 is a perspective view of the entire arrangement of a steering device for a vehicle according to the second embodiment.

As shown in FIG. 5, the second embodiment also includes two first Bowden wires 5 and 6 with each connected at one end to the driving pulley housing 2, and two second Bowden wires 5' and 6' with each connected between an intermediate interlocking means 45 and the gear box 3. Inner cables 5i and 6i of the first Bowden wires 5 and 6 are the same as those in the first embodiment, but inner cables 5i and 6i of the second Bowden wires 5' and 6' are comprised of geared cables which have a plurality of gear teeth formed thereon at axially equal distances (see FIG. 7). The other ends of the first Bowden wires 5 and 6 and one of each of the second Bowden wires 5' and 6' are connected to each other in series within two guide tubes 46 and 47 of the intermediate interlocking means 45.

As shown in FIGS. 6 and 7, a pinion 48 constituting a wire follower means in the second embodiment is fixed to the outer periphery of the motor output shaft 25 of the gear box 3, and the inner cables 5i and 6i in the form of the geared cables are meshed with the pinion 48.

Therefore, when the displacement of the first Bowden wires 5 and 6 caused by the operation of the steering wheel 1 is transmitted to the second Bowden wires 5' and 6' by the intermediate interlocking means 45, and the motor output shaft 25 is rotated along with the pinion 48 meshed with the second Bowden wires 5' and 6', the steering rod 24 is moved laterally through the ball screw mechanism 27 to steer the wheels $W_F$ and $W_R$. At this time, when the electronic control unit U causes the motor 20 to be driven in accordance with the steering torque of the steering wheel 1, the motor output shaft 25 is rotated to bias the steering rod 24 laterally, thereby assisting the operation of the steering wheel 1 provided by a driver.

Even in the second embodiment, since the pinion 48 is provided integrally with the motor output shaft 25, the ball screw mechanism 27 for transmitting the steering torque from the motor 20 to the steering rod 24 can be also used for transmitting the steering torque from the follower pulley 28 to the steering rod 24, thereby providing a simplified structure and a decrease in the previously experienced loss in transmission of the steering torque.

Although the embodiments of the present invention have been described in detail, it will be understood that the present invention is not limited to the above-described embodiments, and various modifications may be made without departing from the spirit and scope of the invention defined by the claims.

For example, the driving pulley 13 is employed as the wire driving means, and the follower pulley 28 or the pinion 48 is employed as the wire follower means in the embodiments, but in place of the driving pulley 13 and the follower pulley 28 or the pinion 48, arms may be employed which are secured at their central portions to the rotary shafts 12, 21 and connected at their opposite ends to the inner cables 5i and 6i of the Bowden wires 5, 5', 6 and 6'. The intermediate interlocking means 7, 45 in the embodiments is not essential, and may be omitted as the case may be.

As described above, in the cable-type steering device of the present invention, the motor is mounted in the gear box for assisting the operation of the steering wheel, and the wire follower means is coaxially coupled to the output shaft of the motor. Therefore, the steering torque transmitted from the steering wheel through the wires to the wire follower means and the steering torque transmitted the motor through the motor output shaft can be transmitted to the wheels through the common steering torque transmitting system. Thus, the steering torque transmitting system is simplified and moreover, the previously experienced loss in transmission of the steering torque is decreased.

According to another feature of the present invention, the wire follower means is provided in the form of a pulley, and the wires are wound around the pulley. Therefore, the reciprocating movement of the wires can be reliably converted into rotating movement of the wire follower means.

According to another embodiment of the present invention, the wires are geared wires which are meshed with a wire follower means comprised of a pinion. Therefore, the reciprocating movement of the wires can be reliably converted into rotating movement of the wire follower means.

What is claimed is:

1. A cable-type steering device for a vehicle comprising
   a wire driving means connected to a steering wheel,
   a gear box connected to steerable wheels of a vehicle,
   a wire follower means mounted in said gear box,
   a motor mounted in said gear box and having an output shaft for assisting operation of said steering wheel,
   wires connecting said wire driving means and said wire follower means to transmit steering torque applied to the steering wheel to the gear box, and
   means coaxially coupling said wire follower means to said output shaft of said motor.

2. A cable-type steering device according to claim 1, wherein said wire follower means is a pulley, and said wires are wound around said pulley.

3. A cable-type steering device according to claim 1, wherein said wire follower means comprises a pinion and said wires are geared wires meshed with said pinion.

\* \* \* \* \*